Nov. 18, 1930.  D. C. DOBBINS  1,782,342
TRANSMISSION MECHANISM
Filed March 7, 1930   3 Sheets-Sheet 3
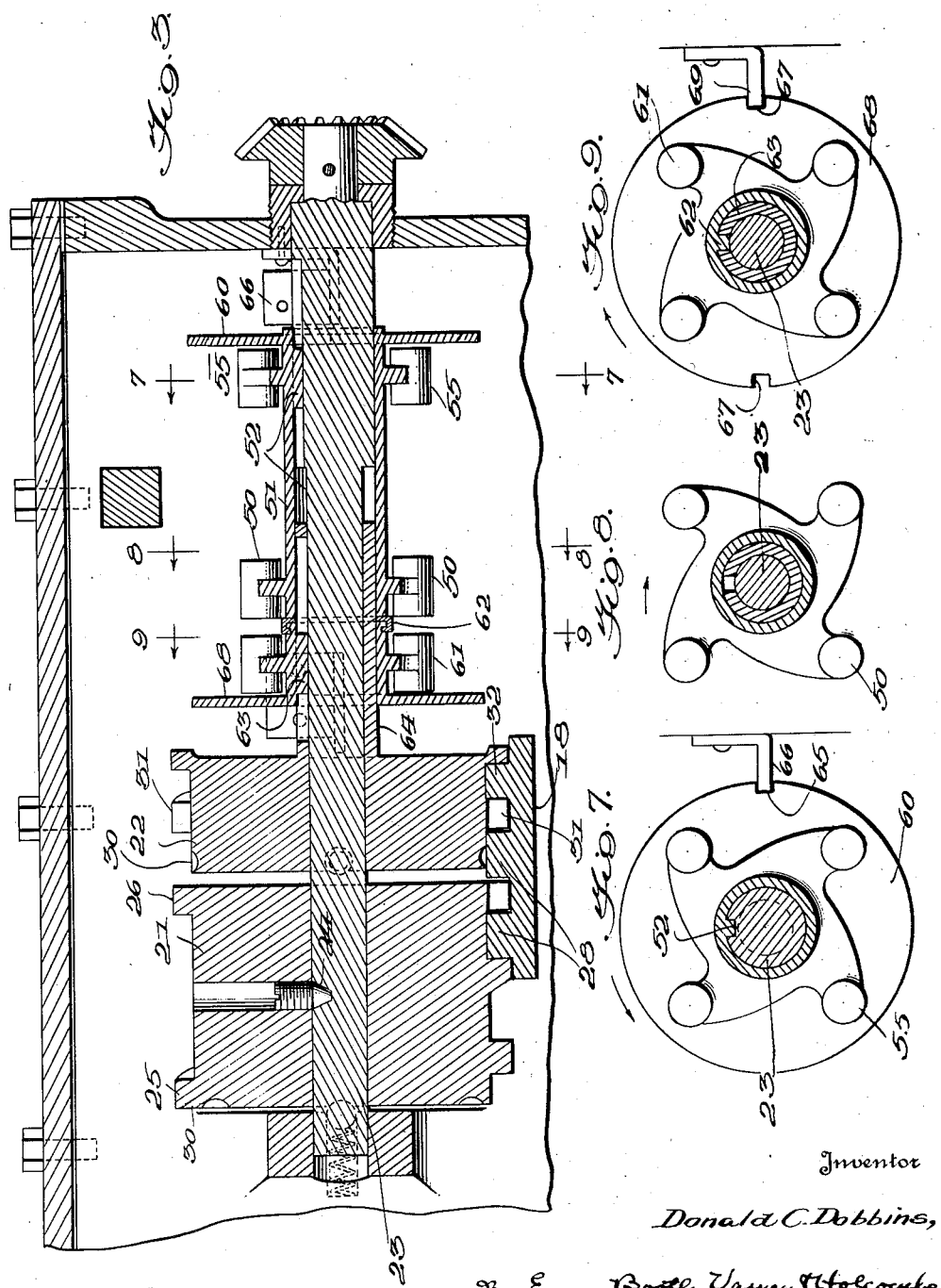
Inventor
Donald C. Dobbins,
By Emery, Booth, Varney & Holcombe
his Attorneys Patented Nov. 18, 1930

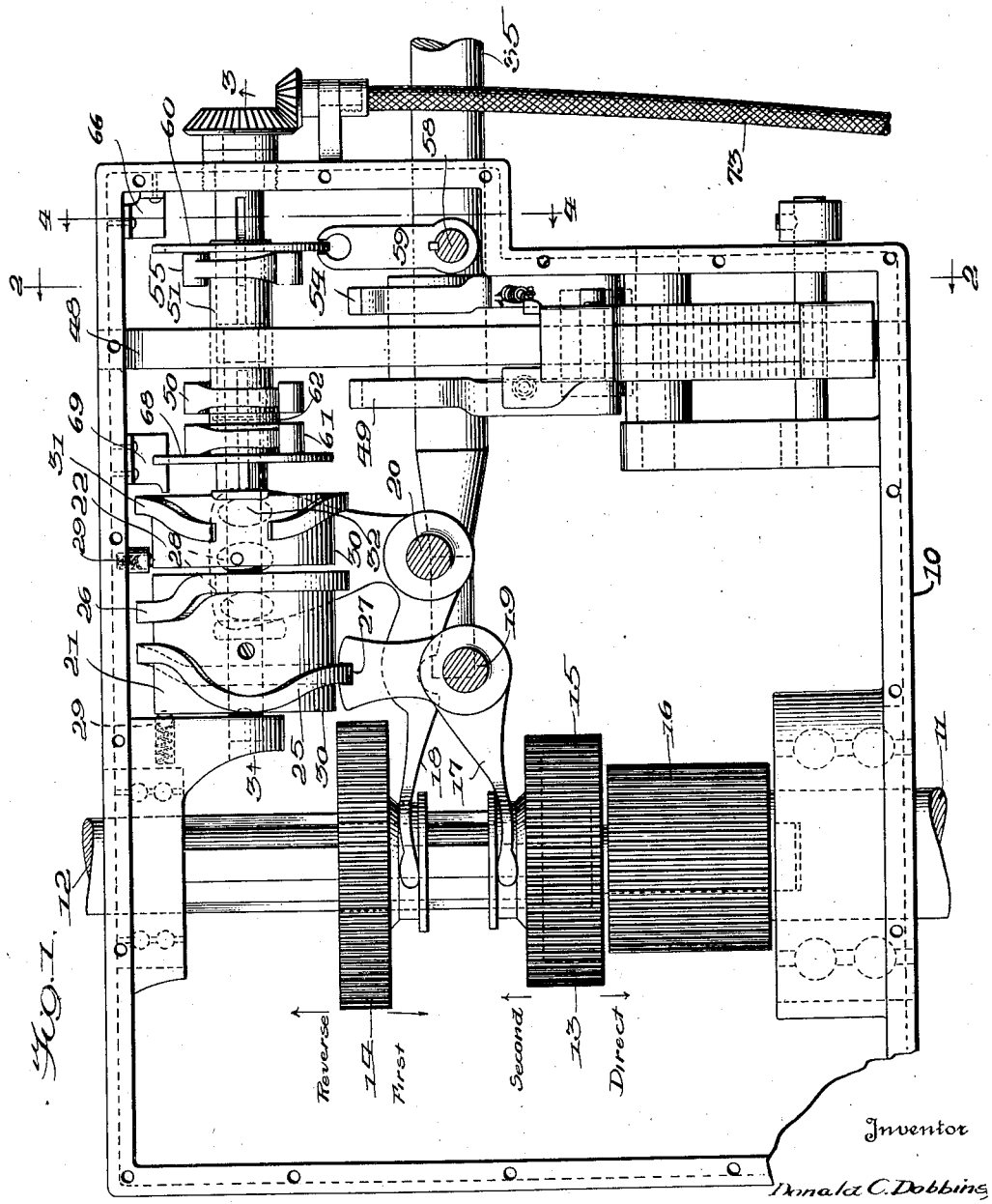

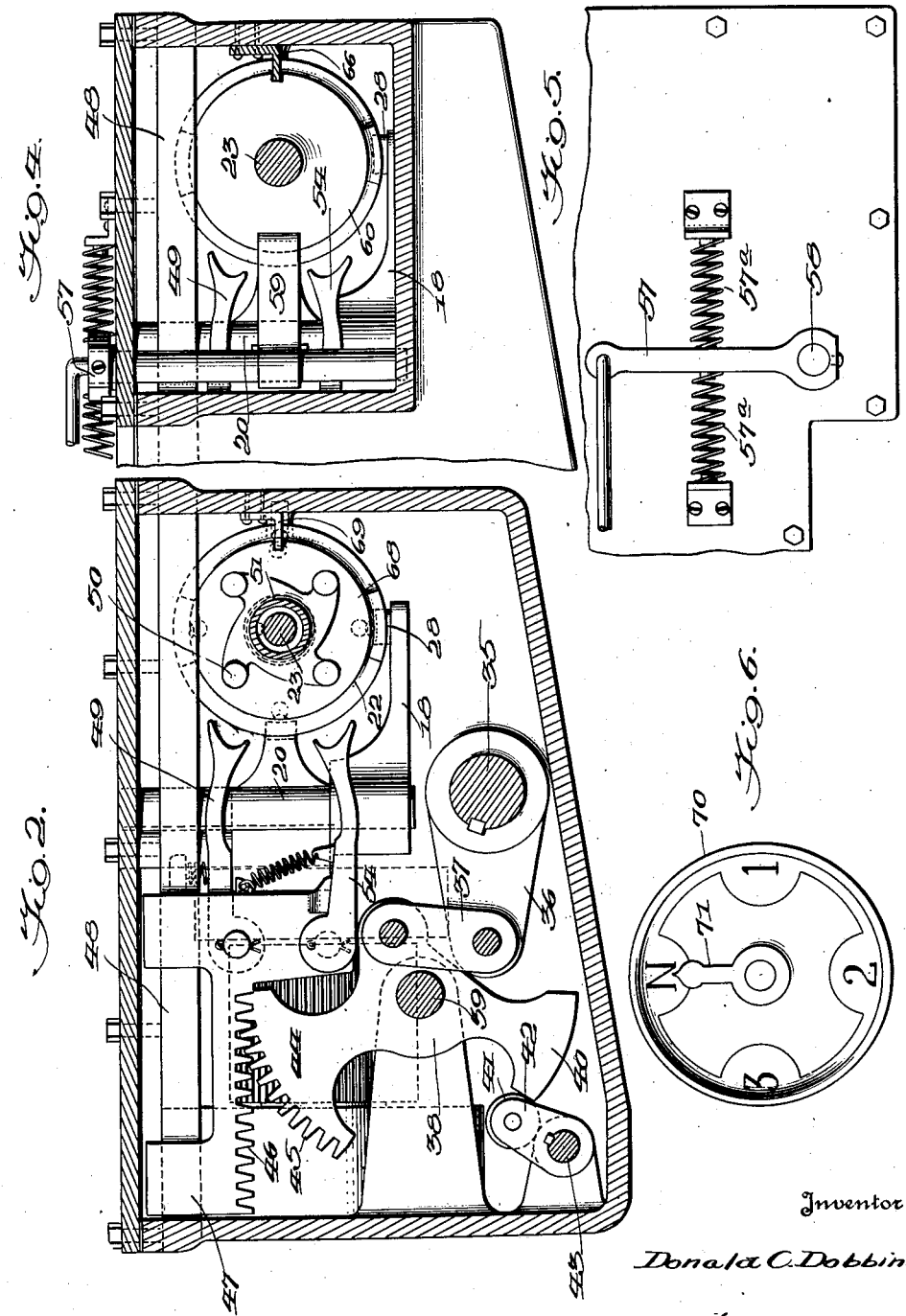

1,782,342

UNITED STATES PATENT OFFICE

DONALD C. DOBBINS, OF CHAMPAIGN, ILLINOIS

TRANSMISSION MECHANISM

Application filed March 7, 1930. Serial No. 433,981.

The present invention relates to change speed transmissions for motor vehicles and the like and aims generally to improve existing transmissions.

One of the principal aims of the invention is the provision of means controlled solely by the depression of the clutch pedal for successively shifting the change speed gearing successively from neutral through a progressive series of different speeds, so that the presence of the usual manually operated gear shifting lever is eliminated.

Other objects and advantages of the invention will be apparent from the more detailed description of one practical embodiment of the invention which has been selected for illustrative purposes, and shown in the accompanying drawings wherein Fig. 1 is a plan view of my improved transmission, the cover of the transmission case being removed;

Fig. 2 is a vertical sectional view thereof taken on the line 2—2 of Fig. 1;

Fig. 3 is a transverse vertical sectional view taken on the line 3—3 of Fig. 1;

Fig. 4 is a detail sectional view of the direction selector taken on the the line 4—4 of Fig. 1;

Fig. 5 is a detail plan view thereof;

Fig. 6 is a detail view in elevation of the indicator for indicating the position of the gearing; and Figs. 7, 8 and 9 are detail sectional views taken on the lines 7—7, 8—8 and 9—9 respectively, of Fig. 3.

In the illustrated embodiment of the invention the transmission casing 10 which houses the transmission gears, also provides a housing for the shifting mechanism therefor, so that the entire mechanism may be conveniently assembled and installed in the vehicle with ease.

The transmission gearing may be of suitable design and construction suitable for transmitting power through a series of intermediate gears (not shown) from the clutch controlled driving shaft 11 to a driven shaft 12 adapted to drive the vehicle. Selective driving speeds may be and are usually effected by shifting a pair of pinions, such as 13 and 14, splined upon the shaft 12, to a neutral position or successively into engagement with first, second, and reverse transmission gears (not shown). High speed or direct drive may be effected by shifting the pinion 13 with its internal gear 15 into meshing engagement with a gear 16 on the clutch driving shaft 11, as is well understood.

The shifting of the pinions 13 and 14 may be advantageously accomplished in the conventional manner by gear shifting forks or yokes 17 and 18, herein shown in the form of bell crank levers, journalled respectively upon posts 19 and 20 in the transmission casing 10.

According to my invention suitable means is provided for shifting the pinions 13 and 14, into engagement with the desired speed reduction or transmission gear, and controlled solely upon depression of the clutch pedal, and as shown, rotatable cam members 21 and 22 are journalled in the casing 10 upon a shaft 23 for shifting the bell crank levers as desired. The cam member 21, for example, may be suitably keyed as at 24 to shaft 23 and provided with peripheral cam ribs 25 and 26 adapted to control respectively, the position of the yoke 17 and pinion 13, either in its neutral, direct drive or second speed driving position, and the yoke 18 and pinion 14 in its neutral or low speed driving position.

For example, the cam rib 25 may run in a notch 27 in the yoke member 17 and move the pinion 13 to its neutral position as shown in Fig. 1, or into engagement with the second speed gears (not shown) or the direct driven gear 16, as desired. The cam rib 26 runs between spaced bosses 28 on the lever arm of the yoke 18 and moves the pinion 14 into neutral position (as shown in Fig. 1) or into engagement with the low speed gear (not shown). Spring pressed detents 29 are adapted to engage in seats 30 in the cam members 21 and 22 and hold the cams against accidental shifting except when positively controlled by depression of the foot pedal.

The cam member 22 controls movement of the pinion 14 into engagement with the reverse gear (not shown) by means of a peripheral cam rib 31 working between a boss 32 and the adjacent boss 28 on the lever arm of the yoke.

Progressive partial or quarter revolutions of the cam members 21 and 22 to shift the pinions 13 and 14 into desired position, are advantageously effected and controlled by depression of a foot pedal (not shown) fixedly connected to shaft 35 journalled on the casing 10, and carrying lever member 36 (see Fig. 2) connected by link 37 to actuator 38 on a stub shaft 39 mounted in the casing 10. The actuator 38 may be, as shown, in the form of a bell crank lever, having one arm 40 adapted to engage roller 41 on arm 42 connected to a clutch release shaft 43 so that the initial depressing movement of the pedal acts to disengage the clutch and hold it disengaged during the succeeding shifting of the gears. The other arm 44 of the actuator may conveniently be in the form of a gear segment 45 meshing with a rack 46 on a carriage 47 slidable on a guide or support 48, so that movement of the actuator, upon depressing of the pedal, will slide the carriage in a direction toward the shaft 23.

The carriage 47 has mounted thereon a pawl member 49 adapted to engage a rotary member 50 on a sleeve 51 splined as at 52 to the shaft 23, and an oppositely disposed pawl member 54 mounted on the carriage 47 on the opposite side of the guide 48 is adapted to engage and actuate a rotary member 55 on the opposite end of the sleeve. Normally the rotary member 50 is in longitudinal alignment with the pawl 49, so that successive depressions of the pedal and reciprocation of the pawl 47 will actuate the member 50 through successive quarter revolutions in a clockwise direction, thus rotating the cam member 21 in a clockwise direction to first shift the yoke 18 and pinion 14 from neutral position into low speed position, then shift the pinion 14 back to neutral and the pinion 13 into second speed position and then into direct driving position and then back to neutral.

For shifting the gears in the reverse or retrogressive direction, i. e. from high speed, down through second to first to neutral, the shaft and cam member 21 must be rotated successively in the reverse or counter-clockwise direction, as viewed from Fig. 2. This may be accomplished by manually shifting the sleeve 51 through a manually operated shift lever 57 on a stub shaft 58 normally held in position by suitable means such as springs 57ª (Figs. 1, 4 and 5) having a fork 59 to engage a disk 60 on the sleeve adjacent the rotary member 55, whereby to shift the sleeve 51 to the left (as viewed from Fig. 1), thus moving the member 55 into alignment with the pawl 54, and the rotary member 50 out of alignment with the pawl 49. In this position successive reciprocations of the carriage 47, due to successive depressions of the pedal, permits the pawl 54 to engage the rotary member 55 and impart to it and its shaft 23 and cam 21 successive quarter revolutions in a counter-clockwise direction.

The shifting of the pinion 14 into engagement with the reverse gears is accomplished by rotation of the cam 22 in a clockwise direction, as explained above. To effect this movement the shift lever 57 is actuated to shift sleeve 51 to the right (as viewed from Fig. 1) thus shifting rotary members 50 and 55 out of alignment with their respective pawls 49 and 54. A reverse rotary member 61 similar to members 50 and 55 is connected to the sleeve as at 62 for lateral shifting movement therewith but free to rotate relatively thereto, and is splined at 63 upon a sleeve 64 carried by the cam member 22 (see Fig. 3), thus bringing rotary member 61 in line with pawl 49, so that on depression of the clutch pedal, the rotary member 61 and cam 22 will be rotated one quarter turn in a clockwise direction, shifting the pinion 14 into engagement with the reverse driving gear. Disengagement of the pinion 14 from the reverse drive gear, is effective upon the next succeeding depression of the clutch pedal, which, acting through pawl 49, rotates members 61 and cam 22 an additional quarter-revolution in a clockwise direction, returning the cam to the position shown in Fig. 1, at which time the pinion 14 is in its neutral position.

The above described shifting of the sleeve 51 for reverse gear drive can only be accomplished when the pinions 13 and 14 are in their neutral position, at which time a notch 65 in the disk 60 is in line with a fixed key 66 on the casing 10. This locks the forward driving members 50 and 55 and cam 21 against any accidental or unintentional movement while the pinion 14 is in engagement with the reverse driving gear. Similarly when either of the forward driving members is in a position to be rotated by the pawls 49 and 54, a notch 67 on a disk 68 of the reverse driving member 61 engages a similar fixed key 69 and prevents accidental shifting of the reversing cam 22 or member 61.

In some instances it may be desirable to provide an indicator for the operator to indicate the position of the transmission gearing. Accordingly, I provide one indicator 70 (see Fig. 6) having a dial graduated to indicate the position of the shiftable gears of the transmission, for example, neutral, first, second or third speeds, as indicated by a pointer 71 driven from the shaft 23 by a suitable flexible driving connection 73 (see Fig. 1).

Advantages of my invention reside in its simplicity of construction, and the ease with which the shifting of the transmission gears may be selected. By simple depressions of the clutch control pedal, progressive shifting of the transmission gears from neutral, through first and second gear to high gear may be easily and quickly effected.

Although I have shown and described the preferred embodiment of my invention as applied to a standard, three-forward speed transmission, it will be clear that in its broader aspects it is applicable to other types and arrangements of gearing.

I claim:

1. In combination with a shiftable change speed gearing, a clutch and a clutch control pedal therefor; of a gear shifting mechanism comprising an actuator operatively connected to said clutch pedal, means for automatically preselecting speed gear shifting for forward speed increasing drive, means for manually preselecting speed gear shifting for reverse and forward speed decreasing drive, means adapted for engagement by said actuator for progressively shifting said gearing in any preselected order or direction through a series of successive speeds to and from neutral position automatically upon successive depressions of said pedal, and means controlled by the initial movement of depression of said pedal for holding said clutch out of engagement, and upon final movement of depression of said pedal for causing said actuator to engage said shifting means.

2. In combination with a standard shiftable change speed gearing including a clutch controlled driving shaft, a control pedal therefor; of a gear shifting mechanism comprising rotatable means for progressively shifting said gearing through a series of successive speeds to and from neutral position automatically upon successive depressions of said pedal without manual preselection for forward progressive speeds, and means controlled by initial depressing movement of said pedal for disengaging the clutch and effecting, upon continued depression of said pedal, shifting of said gearing.

3. In combination with a standard shiftable change speed gearing including a clutch controlled driving shaft, a control pedal therefor; of a gear shifting mechanism comprising means for progressively shifting said gearing through a series of successive speeds to and from neutral position automatically upon successive depressions of said pedal without manual preselection for forward progressive speeds, and means controlled by initial depressing movement of said pedal for disengaging the clutch and effecting, upon continued depression of said pedal, shifting of said gearing into neutral position and then into the next successive speed.

4. A gear shifting mechanism for standard shiftable change speed gearing including a single clutch pedal, a reciprocable carriage operable by said clutch pedal, a pawl carried by said carriage, rotatable means adapted to be engaged by said pawl on successive depressions of said clutch pedal and successively moved through partial revolutions, and cam means controlled by said rotatable means for shifting said gearing in any pre-selected order or direction through a series of successive speeds to and from neutral position automatically upon successive actuations of the clutch pedal.

5. In a shiftable change speed gearing, a clutch and a clutch pedal, means controlled automatically by successive depressions of the clutch pedal for successively shifting said transmission through a series of successive speeds to and from neutral position in either progressive or retrogressive cycles of forward drive or reverse drive, and means controlled upon initial depressing movement of the clutch pedal for releasing said clutch and maintaining said clutch released while effecting shifting of said gearing during final depressing movement of said pedal.

6. In a shiftable change speed gearing, a clutch therefor, a shiftable gear, means for shifting said gear to neutral, and successively into engagement with different speed and direction transmission gears, cam means for moving said shifting means, a single foot pedal, connections associated with said pedal for effecting successive progressive movement of said cam means on successive depressions of said pedal, and means for preventing accidental shifting of said shiftable gear away from a selected transmission gear except upon depression of said lever.

7. In a shiftable gear transmission having shiftable pinions, as defined in claim 1 characterized by yoke members for shifting said pinions selectively into engagement with selected transmission gears, mechanism for shifting said gears comprising rotatable cam means in engagement with said yoke members, pedal controlled means for effecting partial rotation of said cam members and actuation of said yoke members and shifting of said pinions.

8. In a shiftable gear transmission, having shiftable pinions, as defined in claim 5 characterized by yoke members for shifting said pinions selectively into engagement with selected transmission gears, a clutch therefor, mechanism for shifting said gears comprising rotatable cam means, pedal controlled means for initially effecting release of the clutch and subsequent partial rotation of said cam members to shift said pinions.

9. In combination with a shiftable change speed gearing, a clutch therefor, and a clutch control pedal; of gear shifting mechanism operatively associated with the clutch control pedal and adapted on successive depressions thereof to effect automatically progressive shifting of the gears in any preselected order or direction through a series of successive speeds to and from neutral position, means for automatically preselecting speed gear shifting for forward speed driving, means for manually preselecting speed gear shifting for reverse speed driving, and means associated with said mechanism for effecting disengagement of the clutch prior to and during shifting of said gears.

10. In combination with a shiftable change speed gearing, a clutch and single clutch control pedal therefor, yoke members for effecting shifting of said gears, mechanism operatively associated with said clutch pedal and adapted on successive depressions thereof to shift said gears progressively through a series of speeds, said mechanism including a forward direction control cam and a reverse direction control cam, and means for optionally associating said cams cooperatively with said clutch control pedal, whereby reverse gear drive may be optionally separate from the cycles of forward speeds effective upon successive depressions of the clutch pedal.

11. In combination with a shiftable change speed gearing, a clutch and single clutch control pedal therefor, yoke members for effecting shifting of said gears, mechanism operatively associated with said clutch pedal and adapted on successive depressions thereof to shift said gears progressively through a series of speeds, said mechanism including a forward direction control cam and a reverse direction control cam, and means for optionally associating said cams cooperatively with said clutch control pedal whereby reverse gear drive may be optionally separate from the cycles of forward speeds effective upon successive depressions of the clutch pedal, and means for locking the cam out of cooperative association with said pedal against movement.

12. In combination with a shiftable change speed gearing, a clutch and single clutch control pedal therefor, yoke members for effecting shifting of said gears, mechanism operatively associated with said clutch pedal and adapted on successive depressions thereof to shift said gears progressively through a series of speeds, said mechanism including a forward direction control cam and a reverse direction control cam, and means for optionally associating said forward direction cam with said clutch pedal to effect actuation thereof in opposite directions for effecting at will progressive increase or decrease in speeds, without affecting operation of the reverse direction control cam.

13. In a shiftable gear transmission having shiftable pinions, and yoke members for shifting said pinions, the combination of a forward direction cam member and a reverse direction cam member, a single means for successively imparting partial rotative movements to said forward directing cam member successively to effect shifting of said pinions progressively to and from a neutral position through a series of different speeds optionally in speed increasing or decreasing order, and means for locking said reverse direction cam member against movement when rotative movements are imparted to said forward direction cam member.

14. In a shiftable gear transmission having shiftable pinions, and yoke members for shifting said pinions, the combination of a forward direction cam member and a reverse direction cam member, a single means for successively imparting partial rotative movements to said forward directing cam member successively to effect shifting of said pinions progressively to and from a neutral position through a series of different speeds optionally in speed increasing or decreasing order, and means under the control of the operator for optionally controlling the direction of rotative movements of said cam member to increase or decrease the speed.

In testimony whereof, I have signed my name to this specification.

DONALD C. DOBBINS.